G. B. LAMBERT.
VEHICLE WHEEL.
APPLICATION FILED NOV. 10, 1910.
982,143.
Patented Jan. 17, 1911.
2 SHEETS—SHEET 2.
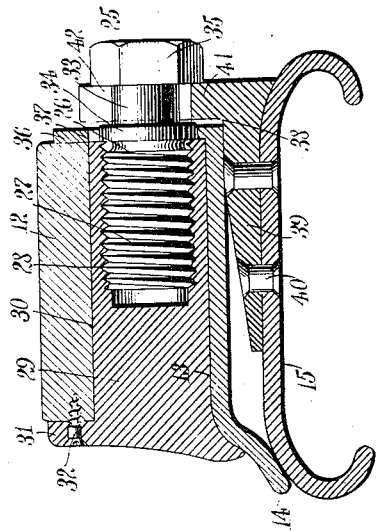
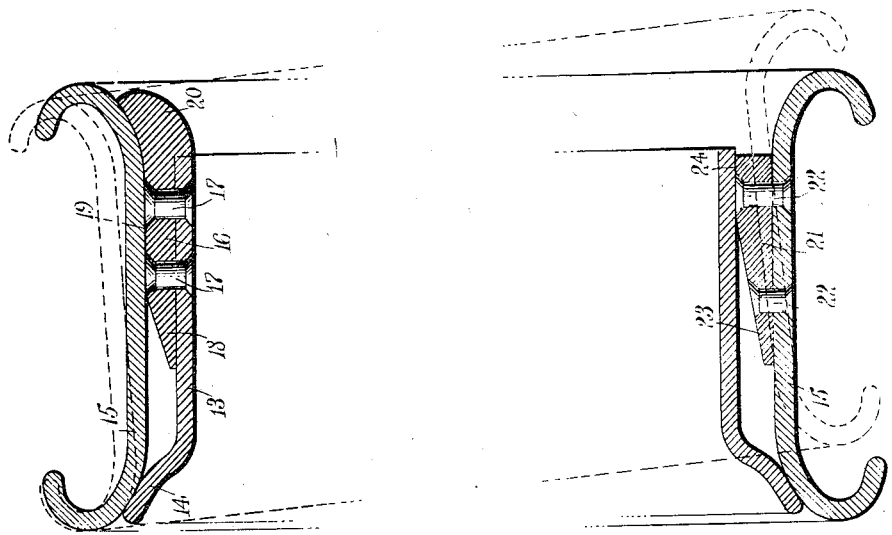
WITNESSES
INVENTOR
Gerard B. Lambert
BY
ATTORNEYS G. B. LAMBERT.
VEHICLE WHEEL.
APPLICATION FILED NOV. 10, 1910.
982,143.
Patented Jan. 17, 1911.
2 SHEETS—SHEET 1.
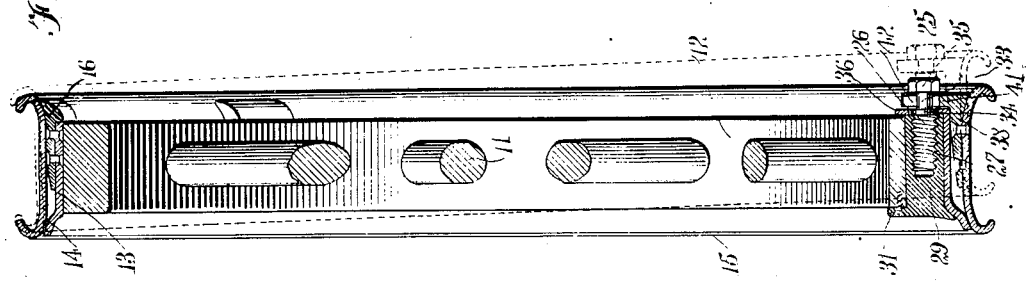
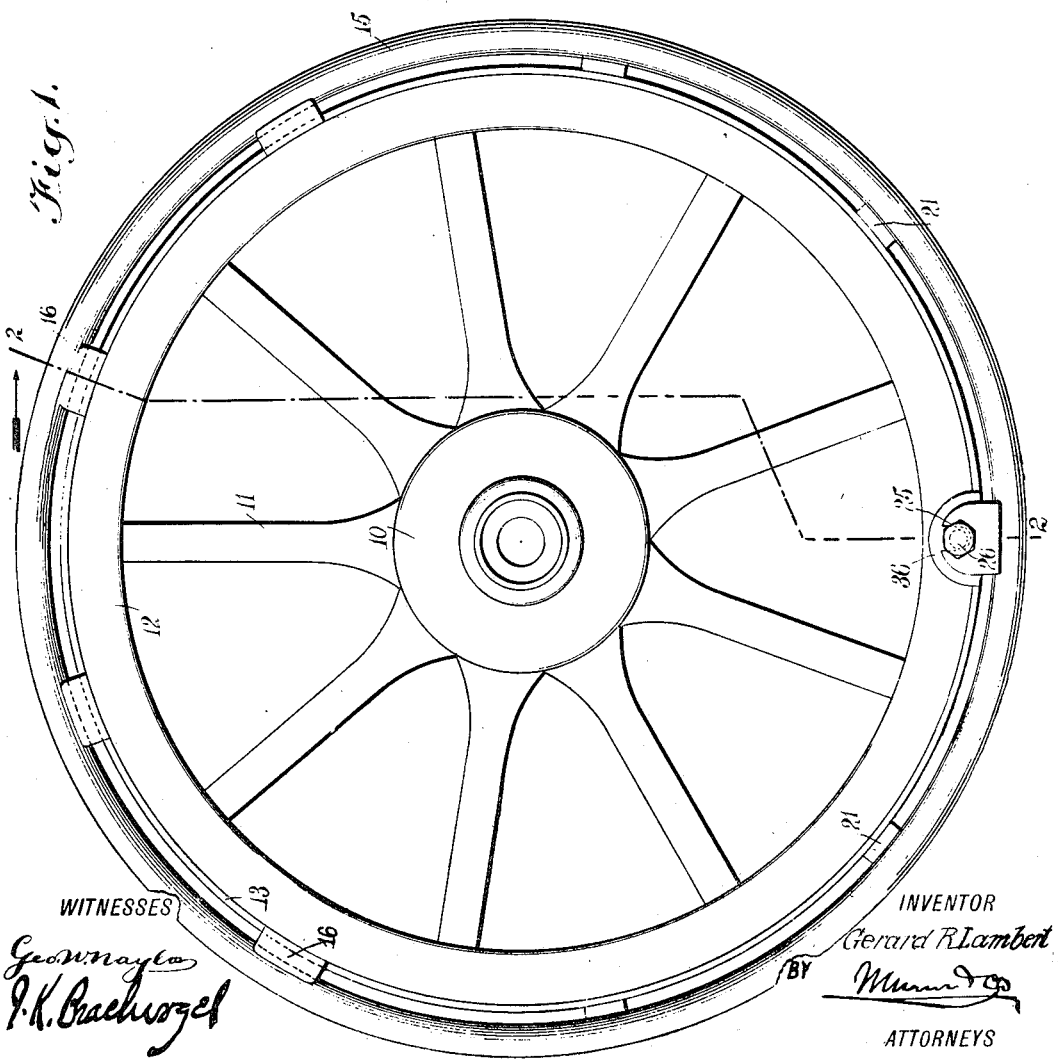
WITNESSES
INVENTOR
Gerard R Lambert
BY
ATTORNEYS

UNITED STATES PATENT OFFICE.

GERARD BAMES LAMBERT, OF NEW YORK, N. Y.

VEHICLE-WHEEL.

982,143.

Specification of Letters Patent.

Patented Jan. 17, 1911.

Application filed November 10, 1910. Serial No. 591,569.

*To all whom it may concern:*

Be it known that I, GERARD B. LAMBERT, a citizen of the United States, and a resident of the city of New York, borough of Manhattan, in the county and State of New York, have invented a new and Improved Vehicle-Wheel, of which the following is a full, clear, and exact description.

This invention relates to vehicle wheels for use with pneumatic and other tires, and has reference more particularly to a vehicle wheel of this class which has a felly, a removable tire rim mounted upon the felly, a keeper for holding the rim in place, and means for moving the rim transversely of the felly at a point remote from the keeper, to cause the rim to swing on the felly as a fulcrum, at a part thereof adjacent to the keeper, so that the rim can be lifted clear of the keeper in removing the rim.

An object of the invention is to provide a simple, strong and durable vehicle wheel, with which pneumatic and other tires can be employed, and which is adapted for use with automobiles and other vehicles, which is comparatively compact in form and light in weight, which differs little in appearance from the ordinary vehicle wheel used for like purposes, in which the clencher or other removable tire carrying rim can be easily and expeditiously removed, to permit the tire to be replaced when necessary, and which requires the operation of but a single releasing device to permit the removal of the rim.

A further object of the invention is to provide a vehicle wheel having a removable tire-carrying rim, in which means are provided for releasing the rim and for locking it securely in place, the operation of the above-mentioned means insuring the secure seating of the rim upon the felly, and also insuring the easy removal of the rim, so that the rim cannot become rusted or otherwise inadvertently fastened upon the felly.

The invention consists in the construction and combination of parts to be more fully described hereinafter and particularly set forth in the claims.
Reference is to be had to the accompanying drawings forming a part of this specification, in which similar characters of reference indicate corresponding parts in all the views, and in which—
Figure 1 is a side elevation of an embodiment of my invention; Fig. 2 is a transverse section on the line 2—2 of Fig. 1, showing in dotted outline certain of the parts in different positions; Fig. 3 is an enlarged, transverse, fragmentary section showing the felly-band, and the removable tire-carrying rim, and indicating in dotted outline a different position of the rim while the same is being removed; and Fig. 4 is an enlarged transverse section of part of the felly, the felly-band and the rim, showing the means for releasing and securing the rim.

Before proceeding to a more detailed explanation of my invention, it should be clearly understood that while the vehicle wheel is particularly useful in connection with the ordinary pneumatic tires commonly employed, which are secured in place by means of a clencher rim, as shown herewith, any other tire-carrying rim, and other forms of tires which it is necessary from time to time to replace, can also be employed. I have found that in the present forms of vehicle wheels having removable tire rims, the latter are secured in place by means of lugs, removable wedges, bolts, and other devices, of which each wheel includes a plurality, so that to remove a rim, in every instance, requires a number of similar operations. Needless to say, this entails considerable time and labor. In my invention I provide means for securely holding the rim upon the wheel or felly, and means for releasing and securing the rim, which comprises a unit, and requires but a single operation. In other words, I employ a single operating member for wedging the rim in place, and for securing it. This operating member serves to swing the rim transversely of the wheel, employing a part of the wheel or felly band as a fulcrum, at a point remote from the operating member. The swinging movement of the rim frees it from the seating wedges, and permits it to be positioned so that it can be lifted clear of the keepers.

Certain of the details of construction shown for example herewith, form no part of the invention, and can be varied in accordance with individual preference and special conditions, without departing from the underlying spirit of the invention.

Referring more particularly to the drawings, I have shown for example herewith, a vehicle wheel comprising the usual hub 10, the spokes 11, and a felly 12. Upon the felly is shrunk or otherwise secured, the felly-band 13, which is permanently associated with the felly, and is of any preferred or common form, having at one edge a laterally inclined retaining flange 14. The clencher or other tire-carrying rim 15, is removably positioned about the felly-band, and when in place, engages at the flange 14, which limits its movement and necessitates that the rim be displaced from the wheel by moving it toward the other edge of the felly-band. Upon the latter is secured a plurality of keepers 16 fastened in place by means of rivets 17 or in any other suitable manner, and secured directly and permanently to the felly-band. The keepers are preferably four in number and extend along substantially one-third of the circumference of the wheel, as is shown most clearly in Fig. 1. The keepers have the inner ends 18 tapered, and present bearing surfaces 19 at the upper faces, upon which the rim 15 can seat. The outer portions 20 of the keepers extend beyond the felly-band and are outwardly disposed and curved to fit snugly against the outer part of the rim 15, to secure this firmly in position, and to prevent its accidental displacement. The under faces of the keeper wedges are preferably cut away to receive the felly-band.

I employ a plurality of seating wedges 21, permanently secured to the rim 15 by means of rivets 22 or in any other suitable manner. The rivets 17 and 22 are countersunk, as is clearly shown in Fig. 3. The seating wedges have the inner portions 23 tapered to form inclined faces, which engage the felly-band when the rim is being forced into position. Near the outer ends 24, the seating wedges have substantially normal faces, which seat against the felly-band when the rim is in position. The outer ends of the seating wedges do not extend beyond the edge of the felly-band when the rim is in position, and are formed that the rim can be swung outward at the seating wedges. These serve merely to bind or jam the rim in place. Their functions are thus somewhat different from the functions of the keepers 20 which act as stops, to prevent the lateral displacement of the rim under normal conditions. The seating wedges also tend to stretch the rim 15 and thus cause it to seat firmly and uniformly upon all of the wedges and keepers. The seating wedges are preferably four in number, arranged in pairs spaced equidistant from the end keeper wedges.

I employ an operating device 25 which is located between the pairs of seating wedges and is thus diametrically opposite to the series of keeper wedges. The operating device comprises an operating member 26 which has a threaded stem 27 located in a correspondingly threaded opening 28 of a socket 29. The latter is positioned in a transverse bore 30 of the felly, and has at the inner end a rim 31 which seats against the inside of the felly and against the fellyband. The socket is secured in place by means of screws 32 or in any other suitable manner. The operating member 26 has at the outer end a reduced neck 33, and between the same and the threaded stem a laterally extended shoulder 34. At the end of the reduced neck 33 is a head 35 of angular form, which permits the operating member to be manipulated by means of a brace wrench or any other suitable implement. The felly-band at the operating device has an inwardly disposed face plate 36 provided with an opening 37 through which the operating member extends. A wedge member 38, the body 39 of which is similar to the seating wedges, is secured by means of counter-sunk rivets 40, or in any other suitable manner, upon the tire rim, outside of the socket 29. It has a radially disposed end 41 provided with a slot or recess 42, which receives the neck 33 of the operating member. The head 35 of the operating member is at the outside of the end 41. The collar or shoulder 34 of the operating member is positioned between the socket and the end 41. By turning the operating member in one direction or the other, the rim 15 is swung transversely of the felly, pivoting upon the felly-band at the part thereof which is substantially diametrically opposed to the operating device, as is indicated in dotted outline in Fig. 2. It will be understood that as the shoulder 34 and the head 35 of the operating member engage, respectively, at the opposite sides of the end 41, the rim will be carried with the operating member, as the same is screwed out of or into the socket. In this way great force can be applied to free the rim from the felly or to cause it to ride into position upon the wedges and keepers, and little difficulty can be occasioned in removing the rim owing to the rusting of the parts, the incrustation of mud, or other like causes.

In removing the rim it is necessary to swing it outwardly by means of the operating device, until the operating member is free of the socket, so that the opposite portion of the rim can be lifted clear of the keeper wedges. This permits the air inlet valve of the tire, which is located at that portion of the wheel provided with the keeper wedges, to be withdrawn from the opening therefor in the felly. To replace the rim it is merely necessary to reverse the above-described operation.

Having thus described my invention, I claim as new, and desire to secure by Letters Patent:

1. The improvement herein described, comprising a wheel, a tire rim fitting removably to the wheel and fulcruming at one point upon the wheel and held at such point from lateral displacement, means operating at a point remote to the fulcrum and adapted to move the rim laterally onto and off of the wheel, and wedging devices between the wheel and rim adjacent to the operating means.

2. The combination, substantially as described, of a wheel, a removable tire rim mounted upon said wheel, a keeper secured to said wheel and adapted to engage said rim to hold the same in position when the rim is arranged circumferentially about the wheel, a seating wedge permanently secured to the inner side of said rim in position to engage with said wheel, whereby to cause the rim to seat when swung transversely of the wheel, and an operating means to move the rim positively on and off the wheel positioned at a part of the wheel remote from said keeper and operable to swing the said rim transversely of the wheel and upon the same as a fulcrum at a part thereof adjacent to said keeper, whereby after said rim is swung outwardly at the operating point, it can be lifted clear of the remotely disposed keeper.

3. In combination, a wheel, a plurality of keepers secured on the outer periphery of the wheel and spaced apart in the direction of the circumference of the wheel, a removable tire rim and a plurality of seating wedges secured on the inner periphery thereof and spaced apart circumferentially, said keepers occupying one arc of the circumference of the wheel and said seating wedges occupying a complementary arc of the circumference of the rim and means for holding the rim on the wheel.

4. The combination of a wheel, a plurality of keepers on the outer periphery of the wheel and spaced apart in the direction of the circumference of the wheel and a removable tire rim, a plurality of seating wedges on the inner periphery of the tire rim and spaced apart circumferentially with said keepers occupying one arc of the circumference of the wheel and said seating wedges occupying a complementary arc of the circumference of the rim and operating means located in the arc of the rim occupied by the seating wedges and adapted to move the rim at said point laterally with respect to the wheel.

In testimony whereof I have signed my name to this specification in the presence of two subscribing witnesses.

GERARD BAMES LAMBERT.

Witnesses:
W. S. SKINNER,
BERNARD J. CULL.